(12) United States Patent
Fitch et al.

(10) Patent No.: US 9,235,553 B2
(45) Date of Patent: Jan. 12, 2016

(54) VEHICLE COMPUTER SYSTEM WITH TRANSPARENT DISPLAY

(71) Applicant: Hand Held Products, Inc., Fort Mill, SC (US)

(72) Inventors: Timothy R. Fitch, Syracuse, NY (US); Mark Lee Oberpriller, Atlanta, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 113 days.

(21) Appl. No.: 13/780,271

(22) Filed: Feb. 28, 2013

(65) Prior Publication Data

US 2014/0114530 A1    Apr. 24, 2014

Related U.S. Application Data

(60) Provisional application No. 61/715,990, filed on Oct. 19, 2012.

(51) Int. Cl.
*G06F 17/00*    (2006.01)
*B60K 35/00*    (2006.01)
*G08G 1/00*    (2006.01)
(Continued)

(52) U.S. Cl.
CPC ............... *G06F 17/00* (2013.01); *B60K 28/02* (2013.01); *B60K 35/00* (2013.01); *B66F 9/24* (2013.01); *G08G 1/00* (2013.01); *B60K 2350/967* (2013.01); *B60Y 2200/15* (2013.01)

(58) Field of Classification Search
CPC ........... G06F 17/00; G08G 1/00; B60K 35/00

USPC ...................................... 701/36, 45; 180/271
See application file for complete search history.

(56) References Cited

U.S. PATENT DOCUMENTS

| 5,148,153 A | 9/1992 | Haymond |
| 5,519,410 A | 5/1996 | Smalanskas et al. |
| 5,541,572 A | 7/1996 | Okamoto et al. |

(Continued)

FOREIGN PATENT DOCUMENTS

| CN | 103514040 A | 1/2014 |
| GB | 2509568 A | 7/2014 |

OTHER PUBLICATIONS

Office Action and Search Report, Application No. GB1317240.8 (Published as GB 2509568 on Jul. 9, 2014), Dated May 7, 2014, 6 Pages.

(Continued)

*Primary Examiner* — Mary Cheung
*Assistant Examiner* — Brian P Sweeney
(74) *Attorney, Agent, or Firm* — Additon, Higgins & Pendleton, P.A.

(57) ABSTRACT

The invention relates to a vehicle computer system. The vehicle computer system gathers data from a safety sensor to determine whether the proper safety conditions are present for the vehicle operator to interact with the vehicle computer system. A safety controller receives safety condition data gathered from the safety sensor and instructs the display manager to disable the display of information to the vehicle operator during unsafe operating conditions. The vehicle computer system advantageously employs a transparent display screen to provide greater field of vision of the vehicle operator than could be provided by a traditional display screen.

10 Claims, 3 Drawing Sheets

(51) Int. Cl.
*B60K 28/02* (2006.01)
*B66F 9/24* (2006.01)

(56) References Cited

U.S. PATENT DOCUMENTS

| | | |
|---|---|---|
| 5,949,345 A | 9/1999 | Beckert et al. |
| 6,574,531 B2 | 6/2003 | Tan et al. |
| 6,597,346 B1 | 7/2003 | Havey et al. |
| 6,690,940 B1 | 2/2004 | Brown et al. |
| 7,050,907 B1 | 5/2006 | Janky et al. |
| 7,064,656 B2 | 6/2006 | Belcher et al. |
| 7,482,914 B2 | 1/2009 | Inoue et al. |
| 7,610,130 B1 | 10/2009 | Dixon et al. |
| 7,640,101 B2 | 12/2009 | Pair et al. |
| 7,983,840 B2 | 7/2011 | Pair et al. |
| 8,000,689 B2 | 8/2011 | Featherstone et al. |
| 8,045,976 B2 | 10/2011 | Kiddie et al. |
| 8,077,143 B2 | 12/2011 | Panabaker et al. |
| 8,160,560 B2 | 4/2012 | Geyer et al. |
| 8,344,894 B2 | 1/2013 | Szczerba et al. |
| 8,482,534 B2 | 7/2013 | Pryor |
| 2009/0267921 A1 | 10/2009 | Pryor |
| 2010/0090816 A1 | 4/2010 | Hirsch et al. |
| 2010/0253526 A1* | 10/2010 | Szczerba et al. .............. 340/576 |
| 2014/0019005 A1* | 1/2014 | Lee et al. ........................ 701/36 |
| 2014/0114530 A1 | 4/2014 | Fitch et al. |

OTHER PUBLICATIONS

Brian Heater, "Haier's 46-inch transparent display shows up at IFA, we go eyes-on (video)", Aug. 30. 2012; 8 pages.
SAMSUNG, "Samsung Expanding Transparent Display Market with a New 46-inch LCD Panel", Press Release, Jan. 2012, 1 page.
SAMSUNG, "Samsung Electronics Becomes the World's First in Mass Production of the Transparent LCD Panel", Press Release Mar. 2011, 2 pages.
SAMSUNG, Website Picture and Blurb, Oct. 2014, 1 Page.

* cited by examiner

VEHICLE COMPUTER SYSTEM WITH TRANSPARENT DISPLAY

CROSS-REFERENCE TO PRIORITY APPLICATION

This application hereby claims the benefit of pending U.S. Provisional Patent Application No. 61/715,990 for a "Vehicle Computer System with Transparent Display" (filed Oct. 19, 2012 at the United States Patent and Trademark Office), which is hereby incorporated by reference in its entirety.

FIELD OF THE INVENTION

The disclosure relates generally to computer systems, and, more specifically, to a vehicle computer system having a transparent display.

BACKGROUND OF THE INVENTION

Computer devices have contributed greatly to creating workplace efficiency across all industries. The relatively recent surge in advancements in mobile computing technology have proven especially useful to businesses, particularly those having a mobile workforce. While mobile computing devices do have distinct advantages, they also present unique safety challenges not present in a traditional desktop computing environment. For instance, the near-universal use of mobile computing devices like smartphones has resulted in an increased number of automobile accidents caused by drivers distracted by the use of such devices. Other types of computer devices used in a mobile setting can present similar safety hazards. For instance, computer navigation systems in automobiles may distract a driver from attending to the road. In the industrial setting, heavy equipment and industrial vehicle operators may become distracted by display readouts from computer devices located in the vehicle that are intended to assist the worker in his or her task. For example, a forklift may be equipped with a computer device that assists in the dispatching of the forklift to the proper pickup location within a warehouse. An unsafe operating condition may be created, however, if the forklift operator is distracted by this display of information while attempting to operate the forklift. Additionally, the computer equipment itself tends to inhibit a vehicle operator's field of vision, thereby increasing the likelihood of collisions with objects that are obstructed from view.

Screen blanking technology has previously been implemented to ameliorate the risks associated with the display of information on computer devices within a vehicle. This technology generally disables the display of information on these devices when it is unsafe for the operator of the vehicle to view the information, such as when the vehicle is in motion. While this technology is generally effective at preventing the display of distracting information during specified periods, it does not address the problem of the computer display screen's obstruction of the operator's field of vision even when not displaying information.

What is needed is a computer system suitable for use in a vehicle that provides less obstruction to the vehicle operator's field of vision. In particular, a computer system is needed that has a display screen large enough to display information in an easy-to-read fashion, thereby avoiding undue visual strain on the vehicle operator, while not obstructing the view of the vehicle operator in a manner that would create an unsafe operating environment.

SUMMARY OF THE INVENTION

In one aspect, the present invention embraces a vehicle computer system with a transparent display.

In another aspect, the present invention embraces a vehicle computer system with a transparent display that provides greater operator visibility than a traditional LCD display screen.

In another aspect, the present invention embraces a vehicle computer system with a transparent display that automatically disables the display screen when it is not safe to display information to the operator.

In another aspect, the present invention embraces a vehicle computer system with a transparent display screen that also serves as a vehicle window.

In another aspect, the present invention embraces a vehicle computer system with a transparent display screen that is larger and easier to read than a traditional LCD display screen.

In another aspect, the present invention embraces a vehicle having a vehicle computer system with a transparent display mounted thereto that provides for greater operator visibility than a traditional LCD screen.

In another aspect, the present invention embraces a vehicle computer system having a transparent display screen that can implement augmented reality technology.

The foregoing, as well as other objectives and advantages of the invention, and the manner in which the same are accomplished, are further specified within the following detailed description and its accompanying drawings.

DETAILED DESCRIPTION

Figure 1:
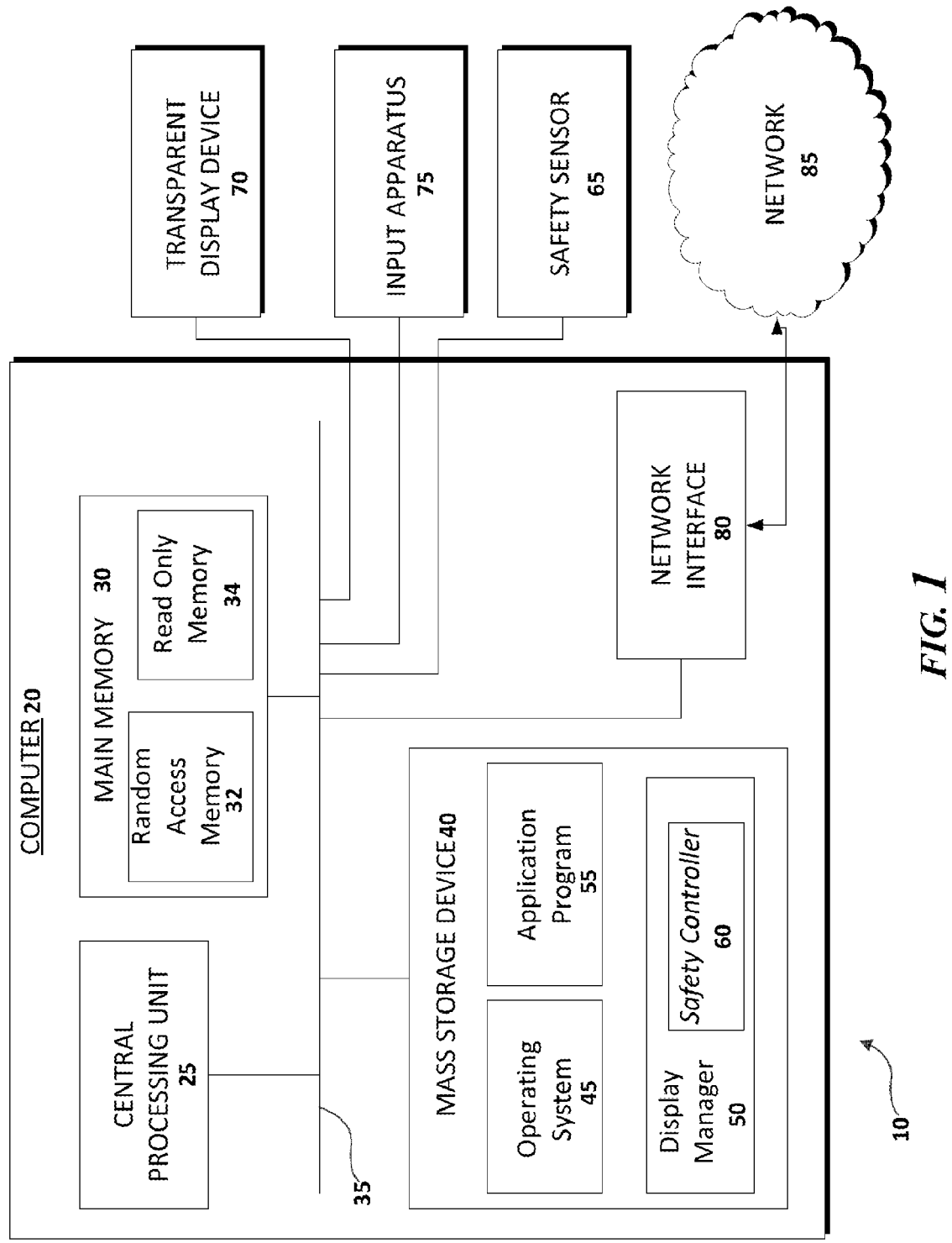
FIG. 1 is a schematic block diagram illustrating the components of an exemplary vehicle computer system according to the present invention.

The disclosure relates to a vehicle computer system. In one aspect, the invention embraces a vehicle computer system having a transparent display.

In an exemplary embodiment, the vehicle computer system according to the present invention has associated with it a central processing unit, a mass storage device, an operating system stored on the mass storage device and executed by the central processing unit, a system memory, an input apparatus for receiving input from user (i.e., an operator or vehicle operator), a transparent display device, a safety sensor, a display manager adapted to control the display of information on the transparent display device, a safety controller adapted to instruct the display manager to modify the display of information on the transparent display device based on safety condition data received from a safety sensor, and a network interface. Typically, the components of the vehicle computer system are operably connected by a system bus.

Typical vehicles employing the vehicle computer system will be industrial vehicles (e.g., forklifts, cargo cranes), but the disclosure equally embraces non-industrial vehicles (e.g., automobiles, mass-transit vehicles (e.g., buses, trains)). References in the disclosure and in the drawings to particular types of vehicles are not intended to limit the disclosure in any way to particular vehicles. Rather, the term vehicle is used in its broadest meaning.

Referring now to the drawings, FIG. 1 is a schematic block diagram illustrating the components of an exemplary embodiment of a vehicle computer system 10. A computer 20 includes a mass storage device 40 for storing an operating system 45 and application programs 55. The mass storage device 40 may store other types of information. The operating system 45 is software that controls the overall operation of the vehicle computer system 10, including process scheduling and management, process protection, and memory management. Examples of a suitable operating system include, without limitation, WINDOWS® 7 and WINDOWS® EMBEDDED COMPACT (i.e., WINDOWS® CE) from MICROSOFT® CORPORATION of Redmond, Wash., and the LINUX® open source operating system. Typically, the operating system 45 is loaded by booting the computer 20 and is executed directly by the central processing unit 25. An application program 55 is an executable software program designed to help the vehicle operator perform specific tasks. The application programs 55 may load automatically upon execution of the operating system 45 or in response to a command input from the vehicle operator. A main memory 30 provides for storage of instructions and data directly accessible by the central processing unit 25. Main memory 30 may include random-access memory 32 (RAM) and read-only memory 34 (ROM). The ROM 34 may permanently store firmware or a basic input/output system (BIOS), which provide the first instructions to the computer 10 when it boots up. The RAM 32 typically serves as temporary and immediately accessible storage for the operating system 45 and application programs 55.

The mass storage device 40 may be any of the various types of computer components capable of storing large amounts of data in a persisting (i.e., non-volatile) and machine-readable manner. Typically, the mass storage device 40 will be a hard disk drive. Alternatively, the mass storage device 40 may be a solid state drive, optical drive, or other component with similar storage capabilities.

In an exemplary embodiment, the mass storage device 40 also stores a display manager 50. The display manager 50 controls the output of images to the transparent display device 70 for viewing by the vehicle operator, typically based upon instructions received from the operating system 45. FIG. 1 depicts the display manager 50 as being a distinct computer program from the operating system 45, but one skilled in the art will appreciate that the display manager 50 may in an alternative embodiment be integrated with the operating system 45.

In an exemplary embodiment depicted in FIG. 1, a safety controller 60 is also stored on the mass storage device 40. The safety controller 60 receives input from the safety sensor 65, and provides instructions to the display manager 50 based on that input as will be described below in detail. FIG. 1 depicts the safety controller 60 as being integrated into the display manager 50. In an alternative embodiment, the safety controller 60 may be discrete from the display manager 50 while still providing instructions to the display manager 50 based upon input received from the safety sensor 65.

An exemplary embodiment of the vehicle computer system 10 according to the present invention also includes a network interface 80. The network interface 80 is logically connected to a communications network 85, thereby enabling the computer 20 to communicate with communications network 85. The communications network 85 may be any collection of computers or communication devices interconnected by communication channels. The communication channels may be wired or wireless. Examples of such communication networks include, without limitation, local area networks, the Internet, and cellular networks. The connection to the communications network 85 allows the computer 20 to communicate with other network nodes. For example, a central dispatcher could send instructions (e.g., a delivery schedule) from a scheduling server to the vehicle operator via the communications network 85.

The vehicle operator interfaces with the vehicle computer system 10 via an input apparatus 75. The input apparatus 75 allows the vehicle operator to initiate and interact with application programs 55 and the operating system 45. The type of input apparatus 75 employed by the vehicle computer system 10 will generally depend upon the input requirements of the application programs 55 (e.g., whether they require data input or simply menu selection). Examples of a suitable input apparatus 75 include, without limitation, a keyboard, a mouse, a light pen, a microphone, a touchpad or a touchscreen. An input apparatus 75 may include a plurality of input devices (e.g., a mouse and a keyboard). Where data input is required, a keyboard would typically be the preferred input apparatus 75. Where touchscreen input is desirable, the input apparatus 75 may be integrated with the transparent display device 70.

A safety sensor 65 is employed to detect safety conditions and transmit data regarding the safety conditions (i.e., safety condition data) to the computer 20. More particularly, the safety sensor 65 communicates safety condition data to the safety controller 60. Examples of types of safety sensors 65 that may be employed, without limitation, are motion sensors (e.g., accelerometers, global positioning satellite receiver devices, speedometers, motion detectors, cameras, etc.), tactile sensors, position sensors, and seat-belt sensors. FIG. 1 depicts the use of a single safety sensor 65, but a person of ordinary skill in the art will appreciate that a plurality of safety sensors 65 may be employed, including safety sensors 65 of different types (e.g., a motion sensor and a seat-belt sensor). Safety conditions include any data used by the safety controller 60 in determining whether to instruct the display manager 50 to start or stop the display of information on the transparent display device 70. Examples of such safety conditions may include, without limitation, vehicle movement, vehicle speed, engagement of the vehicle transmission (i.e., the vehicle transmission is not in the neutral or park position), engagement of the parking brake, and engine status (e.g., running). The safety sensor 65 may or may not be located remotely from the computer 20. The connection between the safety sensor 65 and the system bus 35 may be wired or wireless. The safety controller 60 may also be configured to instruct the display manager 50 to display only certain types of information under certain safety conditions. For example, the safety controller 60 may instruct that only a digital clock graphic taking up a small portion of the viewable area of the transparent display device 70 can be displayed while the vehicle is in motion, thereby allowing for the vehicle operator to know the time while preventing the display of distracting material.

Information is presented to the vehicle operator on a transparent display device 70. Unlike traditional cathode ray tube (CRT) displays or traditional liquid crystal displays (LCDs) that have opaque viewing screens, a transparent display device 70 has a transparent viewing screen. Traditional LCD monitors, for example, require back light units (BLUs) to illuminate liquid crystals to create a viewable image. This configuration results in a device that is opaque. In contrast, a transparent display device 70 does not require a back light unit. Instead, the transparent display device 70 uses ambient light as its light source. Consequently, a transparent display device 70 is able to display images on a viewing screen that is transparent. A non-limiting example of a suitable transparent display device 70 would be the display portion of the NL22B transparent LCD screen offered by SAMSUNG®.

The central processing unit 25, main memory 30, mass storage device 40, network interface 80, transparent display device 70, input apparatus 75 and safety sensor 65 are all operably connected to a system bus 35. The system bus 35 is adapted to transmit data communications between components of the vehicle computer system 10 (e.g., between the central processing unit 25 and the network interface 80).

The vehicle computer system 10 according to the present invention may be configured to disable the display of information on the transparent display device 70 under certain safety conditions. For example, a motion sensing safety sensor 65 may detect when the vehicle 110 is moving, transmit that safety condition to the safety controller 60, which may be configured to disable the display of information on the transparent display device 70 when the safety condition of vehicle movement is detected. Upon receiving notification from the safety sensor 65 that the safety condition (e.g., vehicle movement) is present, the safety controller communicates to the display manager 50 that the display of information on the transparent display device 70 should be disabled (i.e., that the transparent display device 70 should have a blank screen) or that the display of information otherwise be modified. In response to the instructions received from the safety controller 60, the display manager 50 then disables the display of information on the transparent display device 70. In this illustrative example, the vehicle operator is prevented from viewing information on the transparent display device 70 during the presence of a safety condition (vehicle motion, in this instance) where it is not safe to interact with the vehicle computer system 10. Similarly, and by way of further illustration, the safety controller 60 could be configured to instruct the display manager 50 to disable the display of information on the transparent display device 70 when a safety sensor 65 detects that the parking brake is not engaged. Alternatively, the safety controller 60 could be configured to instruct the display manager 50 to disable the display of information on the transparent display device 70 when one safety sensor 65 (e.g., a speedometer) detects that the vehicle speed has exceeded a specified limit and another safety sensor 65 detects that the seatbelt is not engaged. Typically, the safety controller 60 will not instruct the display manager 50 to enable the display of information on the transparent display device 70 until the safety sensor 65 detects that the safety conditions are within defined parameters that are acceptable for the use of the vehicle computer system 10. For example, the safety controller 60 may be configured to instruct the display manager 50 to enable the display of information on the transparent display device 70 only when the parking brake is engaged.

During the presence of safety conditions that are not conducive to safe interaction with the vehicle computer system 10, the disabling (or modification) of the display of information to the transparent display device 70 enhances vehicle operator safety in at least the following respects. First, it prevents the vehicle operator from being distracted by the presence of information on the transparent display device 70 and from acting upon the concomitant temptation to interact with the vehicle computer system 10. Second, the employment of a transparent display device 70 provides for a less obstructed field of vision for the vehicle operator, who can see through substantially the entire display screen of the transparent display device 70 when the display of information is disabled, than traditional display screens with display blanking technology. With a less obstructed field of vision, the vehicle operator is more likely to visually see obstacles and other conditions which could affect the safe operation of the vehicle 110.

An advantage of the vehicle computer system 10 according to the present invention is that it allows for the use of larger displays than would be possible with systems employing display screens with traditional CRT or LCD technology. Because those traditional display screens are opaque—both when active and when disabled—they must be kept relatively small so that the vehicle operator's field of vision is not obstructed any more than is necessary. As a result, many CRT and traditional LCD-based systems employ display screens that are capable of displaying very limited amounts of information. Moreover, the relatively small display screens can be difficult for the vehicle operator to read. Because the transparent display device 70 does not significantly obstruct the vehicle operator's field of vision when the display of information is disabled, the vehicle computer system 10 according to the present invention can use substantially larger displays capable of displaying more information that is easier to read. Furthermore, in alternative exemplary embodiments where the input apparatus 75 is integrated with the transparent display device 70 (e.g., a touchscreen display), the larger screen allows for easier input entry by the vehicle operator. More specifically, the vehicle operator may more easily make input selections because touching a menu item, for example, on a larger touchscreen is easier than doing so on a smaller touchscreen or, in some instances, a smaller keyboard.

Figure 2:
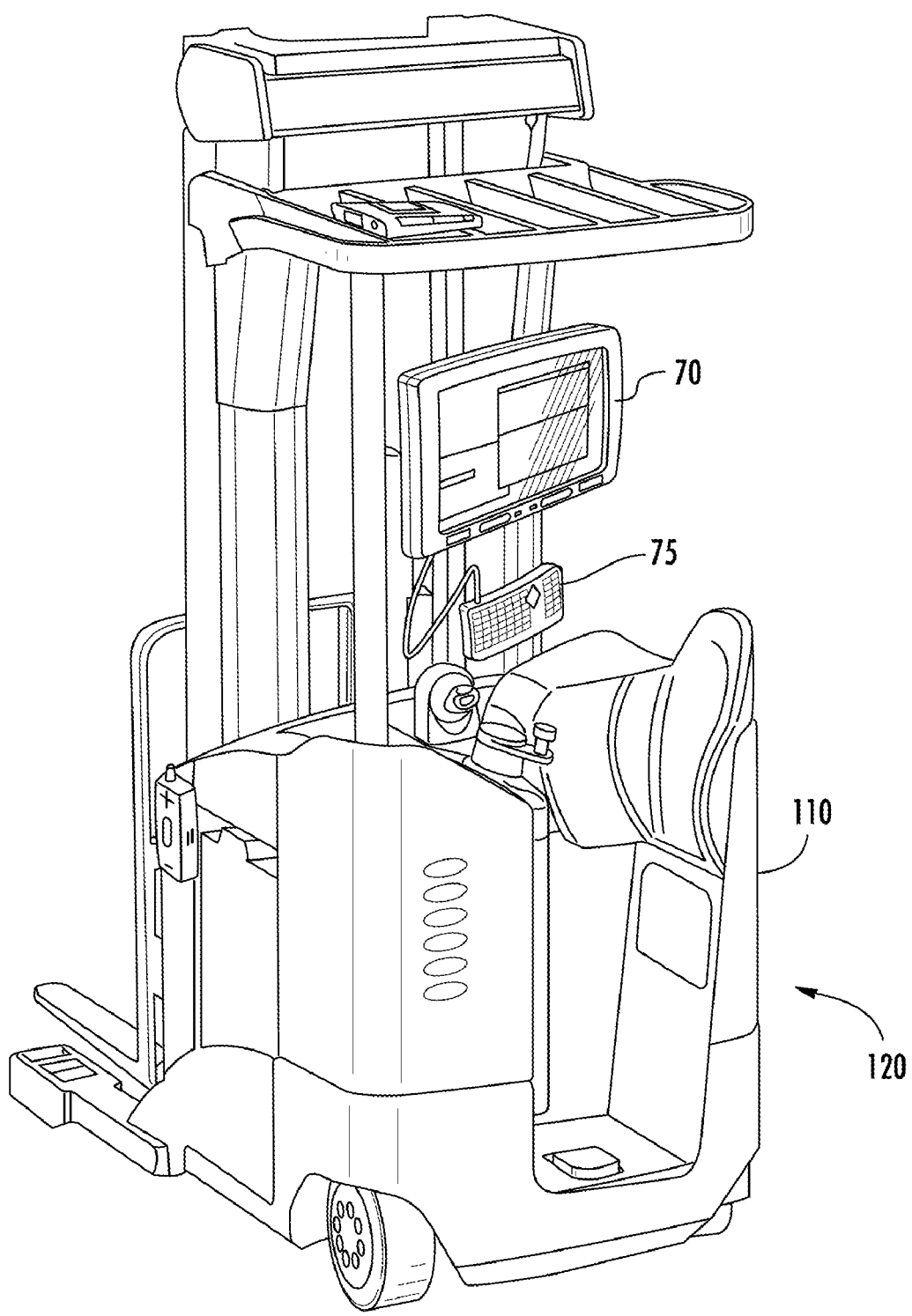
FIG. 2 is a perspective view of an exemplary computer-equipped vehicle according to the present invention.
Figure 3:
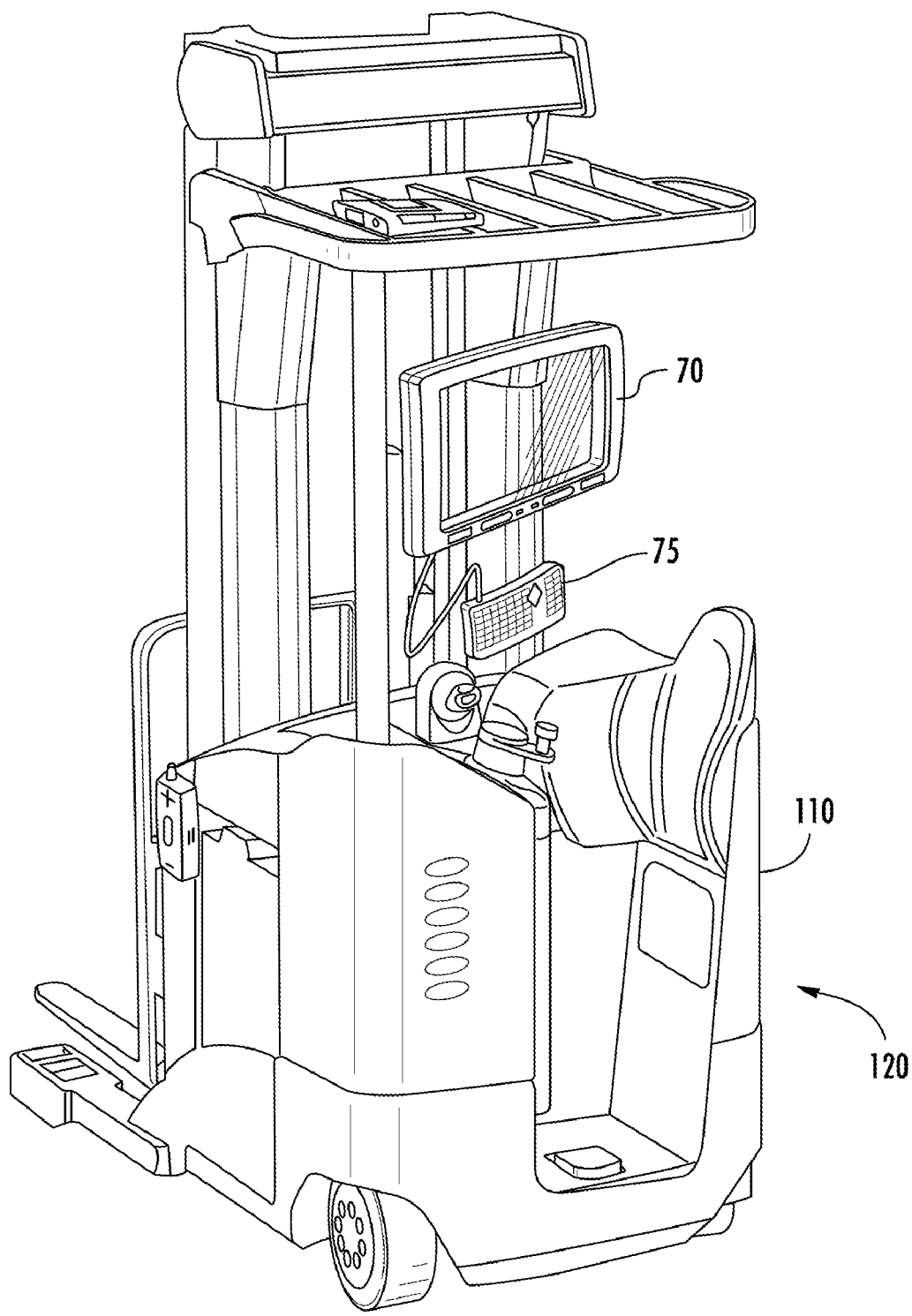
FIG. 3 is a perspective view of an exemplary computer-equipped vehicle according to the present invention.

In another aspect, the disclosure embraces a computer-equipped vehicle 120. As depicted in FIGS. 2 and 3, the computer-equipped vehicle 120 comprises a vehicle 110, a vehicle computer system 10 comprising a central processing unit 25, a main memory 30, a mass storage device 40, an operating system 45 stored on the mass storage device and executed by the central processing unit, an application program 55, an input apparatus 75 for receiving input from a user, a transparent display device 70, a safety sensor 65, a display manager 50 adapted to control the display of information on the transparent display device 70, and a safety controller 60 adapted to instruct the display manager 50 to modify the display of information on the transparent display device 70 based on safety condition data received from the safety sensor 65. The computer-equipped vehicle further comprises a mounting means (not pictured) for mounting the vehicle computer system 10 to the vehicle 110. The mounting means may be any means suitable for fixably or removably mounting the vehicle computer system 10 to the vehicle 110. A non-exclusive example of a suitable mounting means would be a mounting bracket. FIG. 2 depicts a computer-equipped vehicle 120 in a state where information is being displayed on the transparent display device 70. FIG. 3 illustrates how the transparent display screen 70 becomes substantially transparent when the display of information is disabled by the display manager 50.

A computer-equipped vehicle 120 according to the present invention enjoys the safety and usability benefits afforded by the vehicle computer system 10, and, in particular, by the employment of a transparent display device 70 and a safety controller 60. Additionally, a computer-equipped vehicle 120 is better suited to implement software solutions employing augmented reality (AR) technology, including such software solutions as building information modeling (BIM). As will be understood by one of ordinary skill in the art, augmented reality technology enables a computer system to overlay real-time images of the real-world environment with information relevant to elements depicted in those images. By way of example relating to the present invention, a computer-equipped vehicle 120 in the nature of a cargo crane could be configured to overlay the real-world view of cargo containers seen through the transparent display device 70 with information pertaining to individual cargo containers. More specifically, the cargo crane vehicle operator could look through the transparent display device 70 and see real-world cargo containers overlaid with graphical and textual information indicating, for example, the identity and location of the container to load next, cargo container contents, and/or destination information. By way of further example, a computer-equipped vehicle 120 in the nature of a forklift could be configured to receive GPS and/or RFID information and use that information to display an augmented reality environment on the transparent display device 70. More specifically, the augmented reality environment could overlay the real-world environment viewed through the transparent display device 70 with graphical and/or textual data regarding the location of warehoused items to be picked up and the best route to reach their location.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A vehicle computer system comprising:
a central processing unit;
a non-transitory mass storage device;
an operating system stored on said non-transitory mass storage device and executed by said central processing unit;
an input apparatus for receiving input from a user;
a transparent display device;
a safety sensor;
a display manager adapted to control the display of information on said transparent display device;
a safety controller adapted to instruct said display manager to stop or start the display of information and/or display only certain types of information on said transparent display device based on safety condition data received from said safety sensor;
a mounting bracket for removably mounting said vehicle computer system to said vehicle; and
an application program adapted to implement an augmented reality environment.

2. The vehicle computer system of claim 1 comprising a network interface.

3. The vehicle computer system of claim 1 wherein said input means is integrated with said transparent display device.

4. A computer-equipped vehicle that displays information to the operator only when certain safety conditions are met, the vehicle comprising:
a vehicle;
a vehicle computer system comprising:
a central processing unit;
a non-transitory mass storage device;
an operating system stored on said non-transitory mass storage device and executed by said central processing unit;
an input apparatus for receiving input from a user;
a transparent display device;
a safety sensor;
a display manager adapted to control the display of information on said transparent display device; and
a safety controller adapted to instruct said display manager to stop or start the display of information and/or display only certain types of information on said transparent display device based on safety condition data received from said safety sensor;
a mounting means for mounting said vehicle computer system to said vehicle;
said mounting means is a mounting bracket for removably mounting said vehicle computer system to said vehicle; and
an application program adapted to implement an augmented reality environment.

5. The computer-equipped vehicle of claim 4 wherein said vehicle computer system comprises a network interface.

6. The computer-equipped vehicle of claim 4 wherein said input means is integrated with said transparent display device.

7. The computer-equipped vehicle of claim 4 wherein said vehicle comprises a forklift.

8. The computer-equipped vehicle of claim 4 wherein said vehicle comprises a crane.

9. The computer-equipped vehicle of claim 4 wherein said vehicle comprises an automobile.

10. The computer-equipped vehicle of claim 4 wherein said vehicle comprises a mass-transit vehicle.

* * * * *